US008422461B2

(12) United States Patent (10) Patent No.: US 8,422,461 B2
Dickey (45) Date of Patent: Apr. 16, 2013

(54) SELF-CONFIGURABLE WIRELESS NETWORK WITH COOPERATIVE INTERFERENCE MEASUREMENTS BY BASE STATIONS

(75) Inventor: Sergey Dickey, Lovettsville, VA (US)

(73) Assignee: PCTEL, Inc., Bloomindale, IL (US)

( * ) Notice: Subject to any disclaimer, the term of this patent is extended or adjusted under 35 U.S.C. 154(b) by 701 days.

(21) Appl. No.: 12/622,473

(22) Filed: Nov. 20, 2009

(65) Prior Publication Data

US 2010/0130194 A1 May 27, 2010

Related U.S. Application Data

(60) Provisional application No. 61/117,321, filed on Nov. 24, 2008.

(51) Int. Cl.
*H04W 4/00* (2009.01)
(52) U.S. Cl.
USPC ........... 370/332; 370/310; 370/328; 370/329; 370/330; 370/331; 455/67.11; 455/67.13
(58) Field of Classification Search .................. None
See application file for complete search history.

(56) References Cited

U.S. PATENT DOCUMENTS

| | | | |
|---|---|---|---|
| 6,931,235 B2* | 8/2005 | Kline et al. | 455/67.11 |
| 6,950,665 B2* | 9/2005 | Swift et al. | 455/501 |
| 7,280,814 B2 | 10/2007 | Austin et al. | |
| 2001/0034208 A1* | 10/2001 | Kline et al. | 455/67.1 |
| 2002/0004400 A1* | 1/2002 | Fischer et al. | 455/456 |
| 2002/0118730 A1* | 8/2002 | Svensson et al. | 375/150 |
| 2004/0110518 A1* | 6/2004 | Swift et al. | 455/501 |
| 2005/0148368 A1 | 7/2005 | Scheinert et al. | |
| 2007/0097939 A1* | 5/2007 | Nylander et al. | 370/338 |
| 2008/0070510 A1 | 3/2008 | Doppler et al. | |
| 2009/0117876 A1* | 5/2009 | Inoue | 455/411 |
| 2009/0132674 A1* | 5/2009 | Horn et al. | 709/207 |
| 2009/0253421 A1* | 10/2009 | Camp et al. | 455/418 |
| 2009/0316649 A1* | 12/2009 | Chen | 370/331 |
| 2010/0035556 A1* | 2/2010 | Cai et al. | 455/63.2 |
| 2010/0062768 A1* | 3/2010 | Lindqvist et al. | 455/435.1 |
| 2010/0067443 A1* | 3/2010 | Luo et al. | 370/328 |

OTHER PUBLICATIONS

Padhye, J. et al. Estimation of Link Interference in Static Multi-Hop Wireless Networks. In Proceedings of the 5th ACM SIGCOMM Conference on Internet Measurement, pp. 305-310. Oct. 19, 2005.
International Search Report and Written Opinion, PCT/US2009/065566. ISA/KR (Korean Intellectual Property Office), Jul. 9, 2010.
International Preliminary Report on Patentability issued in PCT Application PCT/US2009/065566, mailed on Jun. 3, 2011.

* cited by examiner

*Primary Examiner* — Hassan Phillips
*Assistant Examiner* — Gautam Sharma
(74) *Attorney, Agent, or Firm* — The Marbury Law Group, PLLC

(57) ABSTRACT

Self-configurable wireless network with cooperative interference measurements by base stations. A mini-cell system comprises a plurality of mini-cells. Each mini-cell comprises a communications system for establishing communications with and among remote devices and a signal collection system that provides connectivity to a signal collection network. The signal collection system comprises a scanner and a signal analyzer. The communications system and the signal collection system communicate with a local network controller via the signal collection network to report information about the mini-cell and signals that are received at the mini-cell location. The local network controller may process information received from the mini-cell about its configuration and its own signal and information received from the signal collection system to determine whether to reconfigure the network to mitigate interference and to optimize the mini-cell system.

10 Claims, 7 Drawing Sheets

SELF-CONFIGURABLE WIRELESS NETWORK WITH COOPERATIVE INTERFERENCE MEASUREMENTS BY BASE STATIONS

CROSS REFERENCE TO RELATED APPLICATIONS

This application claims priority under 35 U.S.C. §119(e) from provisional application No. 61/117,321, filed Nov. 24, 2008. The 61/117,321 provisional application is incorporated by reference herein, in its entirety, for all purposes.

BACKGROUND

Cell-based wireless communications provide voice, data and messaging to millions of people. A cell system typically divides a geographic area into cells. A base station operating in the cell receives communications from mobile devices and routes those communications to the appropriate destination. The destination may be within the cell, within another cell, or on another network.

A major limitation in cellular and PCS wireless telephone networks is co-channel interference. In the case of TDMA networks, such as GSM, the co-channel interference arises from the reuse of the spectrum allocation to provide the communications services. A signal may contain not only the desired forward channel from the current cell, but also signals originating in more distant cells. If the interference from a distant cell causes a degradation of the ability of the handset to receive correctly the desired signal, it becomes important to identify the source of co-channel interference and measure the relative strength of interference relative to the desired signal. More information about co-channel interference and its detection may be found in commonly owned U.S. Pat. No. 7,013,113 issued Mar. 14, 2006 for a "Method and Apparatus for Co-Channel Measurements and Interference Component Separation Based on Statistical Signal Processing in Drive-Test Area," U.S. Patent Application Publication 2007/0207740 published Sep. 6, 2007 for "Use Of SCH Bursts For Co-Channel Interference Measurements," and United States Patent Application Publication 2009/0215443 published Aug. 27, 2009 for a "Cellular Drive Test System Network."

The U.S. Pat. No. 7,013,113 and the 2007/0207740 and 2009/0215443 publications are incorporated by reference herein in their entireties for all purposes.

To improve the coverage of cellular communications, particularly within structures or high traffic areas, at least some of the functions of the base station have been incorporated into small capacity devices that serve a limited area and a limited number of calls. For example, picocells and femtocells have been developed to provide coverage within a structure (for example, a building, a train station, an airport, an apartment complex and a stadium). Deployment of one or more of these small capacity devices (generally referred to herein as a "mini-cells") improves coverage and increases data capacity.

Mini-cells are also susceptible to interference. A system of mini-cells must be managed to assure that the cells are operating optimally and that services are provided with minimal errors and lost data.

Because most of the new cells will be deployed indoors, existing techniques of drive-test measurements are not practical. Additionally the cells, in many cases, will be purchased and installed by consumers and small business owners and not by service providers. Accordingly, the providers will not be able to configure the newly installed cells, since they may not even know their locations. Further, the sheer number of the expected deployment of mini-cells and their unpredictable behavior (being turned on and off without notice, for example) make the task of centralized and static network optimization infeasible.

New wireless cellular standards, such as IEEE 802.16m, reflect an understanding of the unique issues affecting mini-cells. These standards generally require wireless networks to include self configuration and dynamic self optimization capabilities. In turn, the manufacturers of base stations provide a so-called "sniffing" feature where a base station is able to listen to the signals of adjacent base stations in order to adjust its own parameters or, alternately, adjust the parameters of other stations in such a way as to minimize mutual interference between stations.

The "sniffing" technique may be inadequate, however, when interfering signals are weak and cannot be decoded and identified. Although methods exist for co-channel interference measurements, they are not easily applied to the self-configurable dynamic and indoor networks, since they are based on conducting drive test-based measurement campaigns.

SUMMARY

Embodiments are directed to systems and methods for isolating an interfering signal in a mini-cell system.

In an embodiment, a mini-cell system comprises a plurality of mini-cells. Each mini-cell comprises a communications system for establishing communications with and among remote devices and a signal collection system that provides connectivity to a signal collection network. The signal collection system comprises a scanner and a signal analyzer. The communications system and the signal collection system communicate with a local network controller via the signal collection network to report information about the mini-cell and signals that are received at the mini-cell location. The local network controller may process information received from the mini-cell about its configuration and its own signal and information received from the signal collection system to determine whether to reconfigure the network to mitigate interference and to optimize the mini-cell system.

In another embodiment, the signal analyzer may process the received signals before sending them to the local network controller. Signal processing, whether performed by the local network controller or by the signal analyzer at a mini-cell, uses signal identification parameters to identify the cell that is the source of an interfering signal. The signal identification parameters are chosen to produce processing gains over signal identification methodologies that depend on signal decoding to identify the source of a particular signal.

In another embodiment, neighboring cells provide information about each other to the local network controller. For example, a cell may provide information about its own timing and signal power and the time and signal powers of its closest neighbor or neighbors.

DETAILED DESCRIPTION

Figure 1:
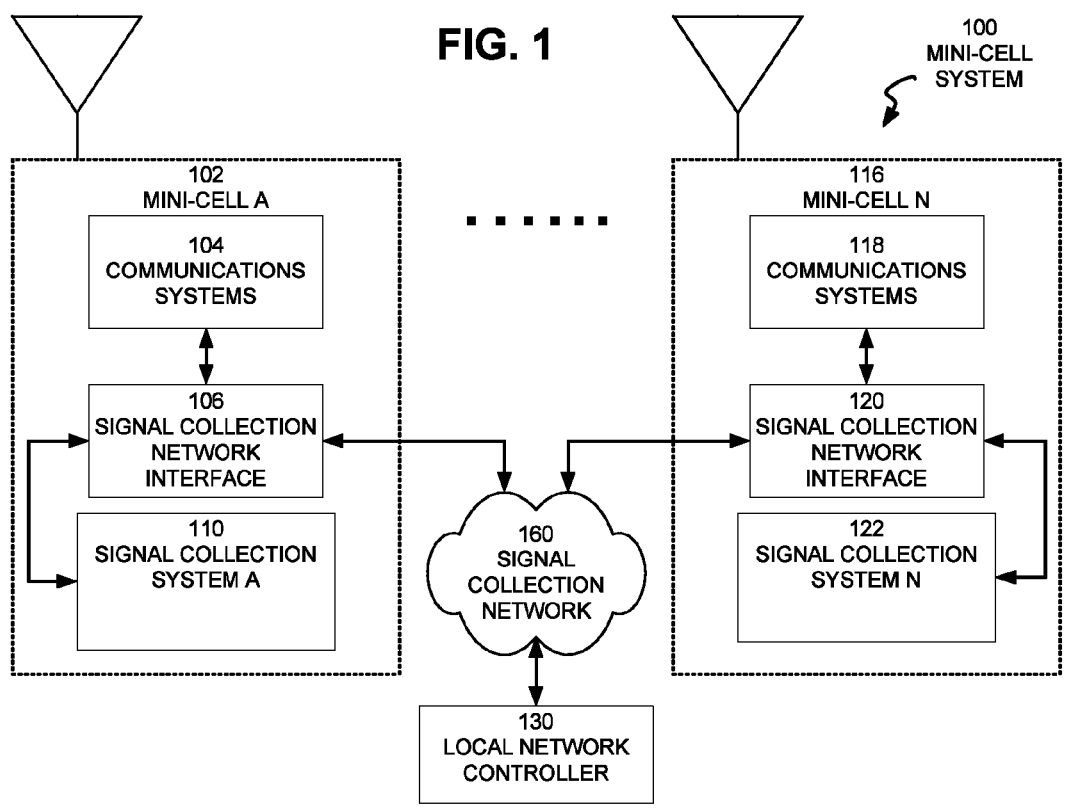
FIG. 1 is a block diagram illustrating elements of a mini-cell installation using a local network controller according to an embodiment

FIG. 1 is a block drawing illustrating components of a mini-cell network according to an embodiment.

A mini-cell system 100 comprises a plurality of mini-cells such as a mini-cell A 102 through mini-cell N 116 (representing the last mini-cell in the mini-cell system 100). While only two mini-cells are illustrated in FIG. 1, the number of mini-cells in mini-cell system 100 is not so limited.

Mini-cell A 102 comprises a communications system 104, a signal collection network interface 106 and a signal collection system 110. Similarly, mini-cell N 116 comprises a communications system 118, a signal collection network interface 120 and a signal collection system 122.

The signal collection network interfaces 106 and 120 connect to a signal collection network 160. Also connected to the signal collection network 160 is local network controller 130.

The signal collection network 160 may be a dedicated wired or wireless network or it may utilize a wired or wireless local area network that is generally accessible within the facilities served by the mini-cell system 100. While the signal collection network 160 could utilize the connectivity offered by the mini-cell system 100, it may be prudent to provide an independent path from the individual cells to the local network controller 130 to assure that the mini-cell system 100 can be accessed and controlled in the face of overwhelming interference.

The components of the mini-cell system 100 may be used in a variety of configurations to identify the source of interference received at a particular mini-cell. The following embodiments are presented to illustrate particular configurations but are not meant to be limiting.

Figure 2:
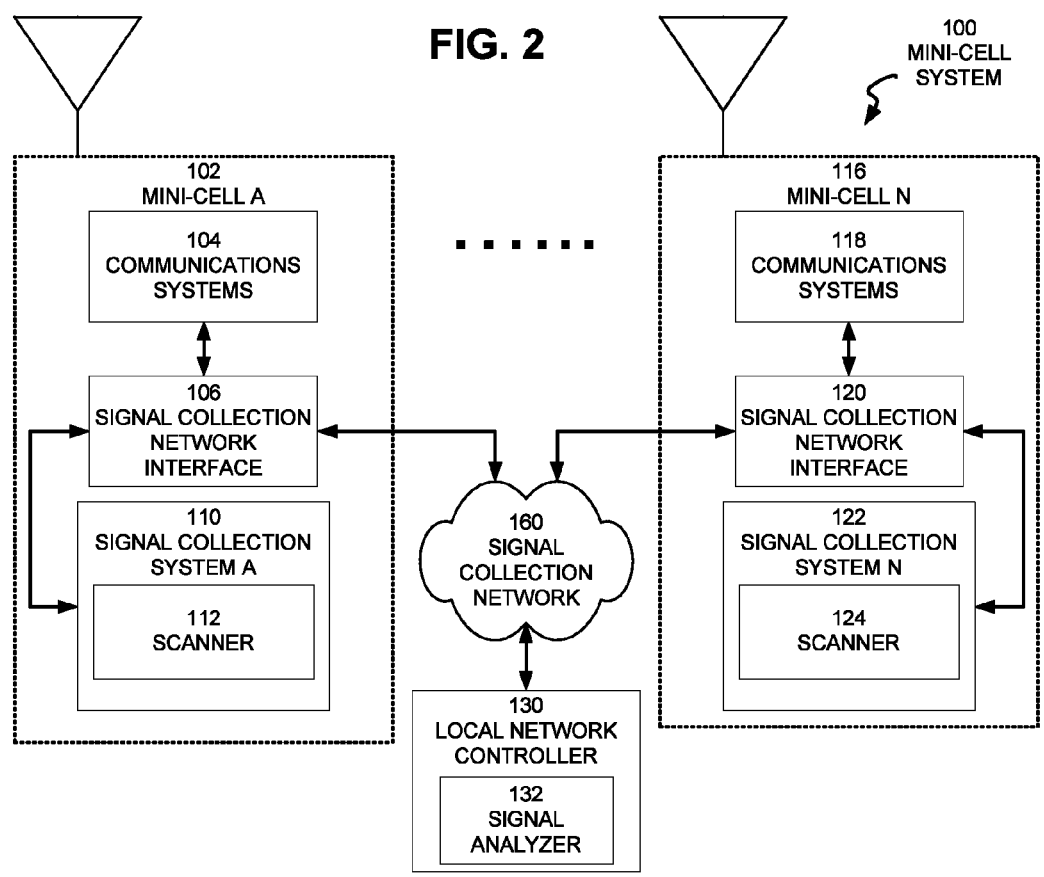
FIG. 2 is a block diagram illustrating additional components of a mini-cell system according to an embodiment.

FIG. 2 is a block diagram illustrating additional components of a mini-cell system 100 according to an embodiment. The mini-cell system 100 comprises a plurality of mini-cells such as a mini-cell A 102 through mini-cell N 116 (representing the last mini-cell in the mini-cell system 100). While only two mini-cells are illustrated in FIG. 2, the number of mini-cells in mini-cell system 100 is not so limited. In this embodiment, signal collection system A 110 comprises a scanner 112, and signal collection system N 122 comprises a scanner 124. A local network controller 130 comprises a signal analyzer 132.

Figure 3:
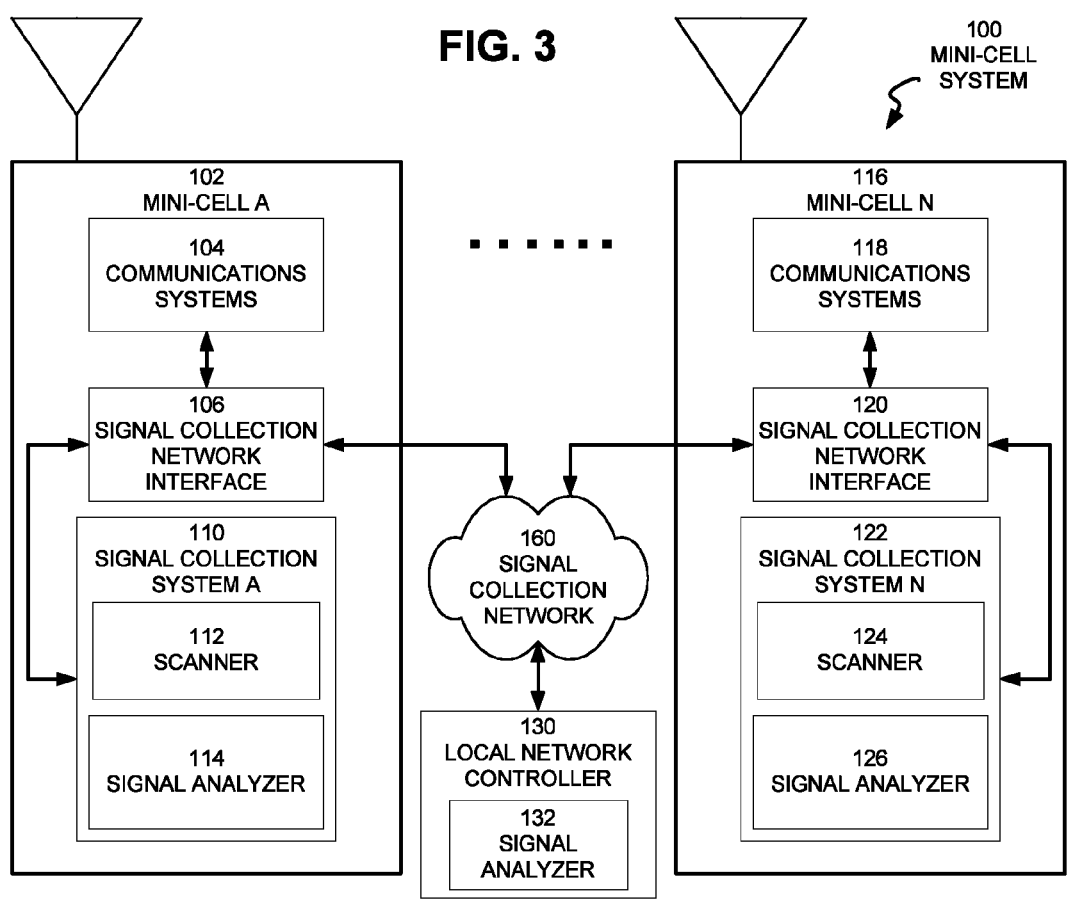
FIG. 3 is a block diagram illustrating elements of a mini-cell installation in which signal analysis functions are shared among a local network controller and signal analyzers in mini-cells according to an embodiment.

FIG. 3 is a block diagram illustrating elements of a mini-cell installation in which signal analysis functions are shared among a local network controller and signal analyzers in mini-cells according to an embodiment. A mini-cell system 100 comprises a plurality of mini-cells such as a mini-cell A 102 through mini-cell N 116 (representing the last mini-cell in the mini-cell system 100). While only two mini-cells are illustrated in FIG. 3, the number of mini-cells in mini-cell system 100 is not so limited. As illustrated in FIG. 3, the signal collection systems (blocks 110 and 122) associated with mini-cell A through N (blocks 102 and 116) comprise scanners (blocks 112 and 124) signal analyzers (blocks 114 and 126). Embodiments illustrated in FIG. 2 and in FIG. 3 are described in detail below.

Signal analysis may be performed only using the signal analyzer 132 of the local network controller 130 as illustrated in FIG. 2 or may it be performed in varying degrees by the signal analyzers (blocks 114 and 126 of FIG. 3) located within the signal collection systems A and N (blocks 112 and 124 of FIG. 3).

Under some conditions, the identification of a signal source may be accomplished by decoding a component of a signal sample to obtain source identifying information of the particular signal component. Since by definition the interfering co-channel signals are often below the power level of the desired signal, the decoding of signal components can be a difficult task and resource intensive task.

In an embodiment, the time of arrival of a known signal component is used to identify the source of the signal. As an example, in the GSM signal, one of the TDMA bursts has fixed contents and normally is used for frequency correction ("FCCH" burst). Since it consists of a long piece of a fixed signal (147-bit-long piece of a sign wave of fixed frequency), its detection provides a processing gain of more than 20 dB, and therefore the detection and timing measurement can be performed even in the presence of stronger signals.

In this embodiment, correlative techniques are used that take advantage of processing gains associated with the presence of long, fixed known signal component patterns that redundantly appear in the signal and other signal attributes that alone or in combination are unique to a signal source. Examples include, but are not limited to, synchronization and other fixed bursts, training sequences, scrambling codes, modulation and MAC-layer parameters (such as used subchannels or subcarriers in each frame) and antenna beam parameters. Additionally, correlation may be performed using variable patterns associated with a selected signal, such as SCH bursts in GSM-type systems, are predicted based on at least one suitable measurement of the respective signals. Additionally, a decoded fragment of digital information carried by the signal at a specified time may be used as a signal identification parameter. Correlation processes can then be used to determine if other sensed signals, which might not be decodable, are the same as, or include the respective signals. The particular signal attributes used in the correlation process depend on the air protocol that is being used by the mini-cell system (for example, GSM, TDAM, CDMA, OFDM, and 4G).

As used herein, "processing" may refer to in real time, near-real time and offline processing. For example, a mini-cell may execute a first process to correlate signal samples in real time received at that mini-cell. The local network controller 130 may process the data of the mini-cell in near real time and may process all of the data received from the plurality of mini-cells off line.

Signal Analysis and Identification Performed at Local Network Controller

Referring again to FIG. 2, mini-cell system 100 comprises a plurality of mini-cells such as a mini-cell A 102 through mini-cell N 116 (representing the last mini-cell in the mini-cell system 100). While only two mini-cells are illustrated in FIG. 2, the number of mini-cells in mini-cell system 100 is not so limited.

In this embodiment, mini-cell A 102 and mini-cell N 116, report their timing and configuration parameters to the local network controller 130 via signal collection network 160 wherein it is stored in memory (not illustrated). The local controller thus maintains a database of the timing and configuration parameters of each mini-cell within the mini-cell system 100. The scanners 112 and 124 sample signals received at their respective mini-cell locations and report the signal samples to the local network controller 130 via signal collection network 160. Identifiable signal components, such as signal peaks or waveforms, are processed by a signal analyzer 132 to correlate the received signal components as described above. The timing and configuration database is used to associate a signal component with a particular source.

In an embodiment, the timing and the configuration information is reported during a measurement interval that may be pre-set or may be dynamically determined based on the state of the mini-cell system 100 as determined by the local network controller 130.

In a multi-cell mini-cell system, the mini-cells provide cooperative measurements effected in various locations in the network at a common point in time. In one embodiment of the present invention, the interfering station can possibly be identified by another station located in proximity to the interfering station, where the conditions for digital decoding of its signal are favorable. The station that identified the signal may send station identification information to the local network controller.

A mini-cell may also report the time of transmission of a signal pattern that is used to identify a signal. The timing information allows the signal analyzer 132 to associate a correlated signal pattern with a source.

As noted above, various signal identification parameters appropriate to the air protocol may be used to identify the source of an interfering signal. For example, synchronization and other fixed bursts, training sequences, scrambling codes, modulation and MAC-layer parameters (such as used subchannels or subcarriers in each frame), antenna beam parameters, and a transmitter power setting. The location of each reporting mini-cell in conjunction with its report data about signal strengths and/or phase information can be used to spatially locate the signal source.

The local network controller 130 may use the configuration parameters of the various mini-cells to instigate changes to the configurations of the various mini-cells to mitigate the interference. For example, a mini-cell may be instructed to change frequencies, to change power, to change its timing and to repoint or reconfigure its antennas.

Signal Analysis and Identification Partially Performed at Mini-cell Site

Referring again to FIG. 3, a mini-cell system 100 comprises a plurality of mini-cells such as a mini-cell A 102 through mini-cell N 116 (representing the last mini-cell in the mini-cell system 100). While only two mini-cells are illustrated in FIG. 3, the number of mini-cells in mini-cell system 100 is not so limited.

In this embodiment, the signal analyzers 114 and 126 located in mini-cells 102 and 106 are used to process the signals received at the mini-cell site and to report the results of this processing to the local network controller 130. The extent of the processing performed at the mini-cell site may depend in on the processing power of the signal analyzer, the amount of data that is to be stored locally, the size of the mini-cell system, etc. In an embodiment, the signal analyzers 114 and 126 located at the mini-cells sites may require data that is stored on the local network controller 130. These data may be accessed via signal collection network 160.

Signal Analysis Performed at Mini-cell Site

Figure 4:
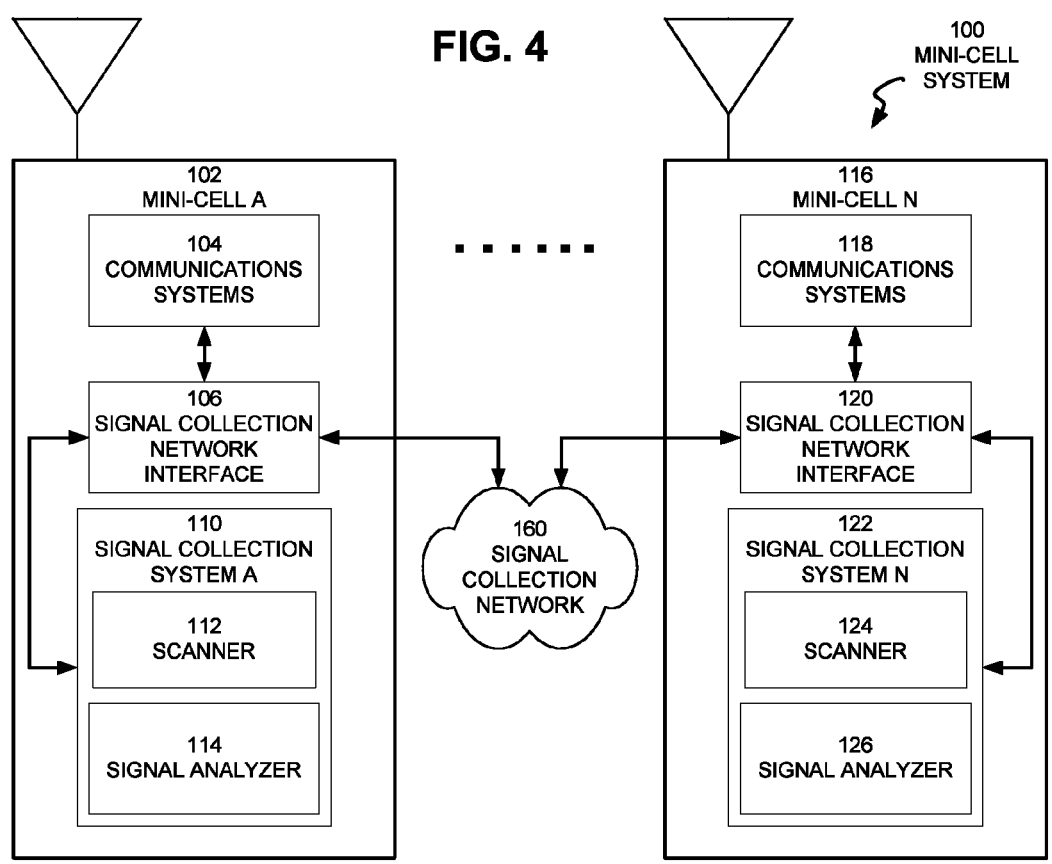
FIG. 4 is a block diagram illustrating elements of a mini-cell system in which signal analysis functions are performed by signal analyzers in mini-cells according to an embodiment.

FIG. 4 is a block diagram illustrating elements of a mini-cell system 100 in which signal analysis functions are performed by signal analyzers in mini-cells according to an embodiment. A mini-cell system 100 comprises a plurality of mini-cells such as a mini-cell A 102 through mini-cell N 116 (representing the last mini-cell in the mini-cell system 100). While only two mini-cells are illustrated in FIG. 4, the number of mini-cells in mini-cell system 100 is not so limited.

In this embodiment, the signal analysis functions are performed by the individual mini-cells, such as the mini-cell A 102 and the mini-cell N 116. The mini-cells report their individual configuration and timing data to each of the other cells via signal collection network 160 wherein it is stored in memory of the signal collection system of the receiving mini-cell (not illustrated).

In this embodiment, the scanners 112 and 124 may report signal sample data to each other for analysis. In an alternate embodiment, the scanners 112 and 124 may pre-process the signal samples and report the results of that processing (e.g., correlation results). The timing and configuration information is used by each cell to associate a particular signal with a particular source.

In an embodiment, the signal collection systems of the mini-cells form a virtual opportunistic network using a hierarchy of various connectivity means and protocol messages over the course of a measurement period.

In another embodiment, each mini-cell determines how to revise its configuration to address interference. A mini-cell may also instruct other cells to adjust their configurations to mitigate the interference being experienced by the affected mini-cell. The ability of a mini-cell to revise its configuration settings and to direct other mini-cells to adjust their settings may be regulated by logic and/or software instructions that prevent an individual mini-cell from adopting configuration settings or issuing reconfiguration instructions that would destabilize the mini-cell system 100.

Other Embodiments

The processing gains that may be obtained by using known signal patterns are improved if the signal pattern is a signal sample that is provided by the mini-cell that transmits the signal sample. That is, the signal sample is reported by the reporting mini-cell via the signal collection network 160 and not received over-the-air. In this embodiment, a mini-cell (for example, mini-cell 102) may report a signal sample to the local network controller 130 along with the time of the transmission of the signal sample. The length of the signal sample that is reported to the local network controller 130 may depend, at least in part, on the number of mini-cells in the mini-cell system 100 and the processing power of the signal analyzer 132. The signal sample may be stored in a memory of the signal analyzer 132 (not illustrated) along with signal samples "directly" reported by other mini-cells (such as mini-cell N 116) via the signal collection network 160. A signal collection system (for example, signal collection system A 110) may report over-the-air signals received at the site of mini-cell A 102 to the signal analyzer 132 around the time of the transmission of the reported signal sample. In this way, the signal analyzer 132 acquires a record of "directly" reported signal samples and over-the-air signals. The correlation of directly reported signal samples to a received over-the-air signal identifies the source of the signal.

Figure 5:
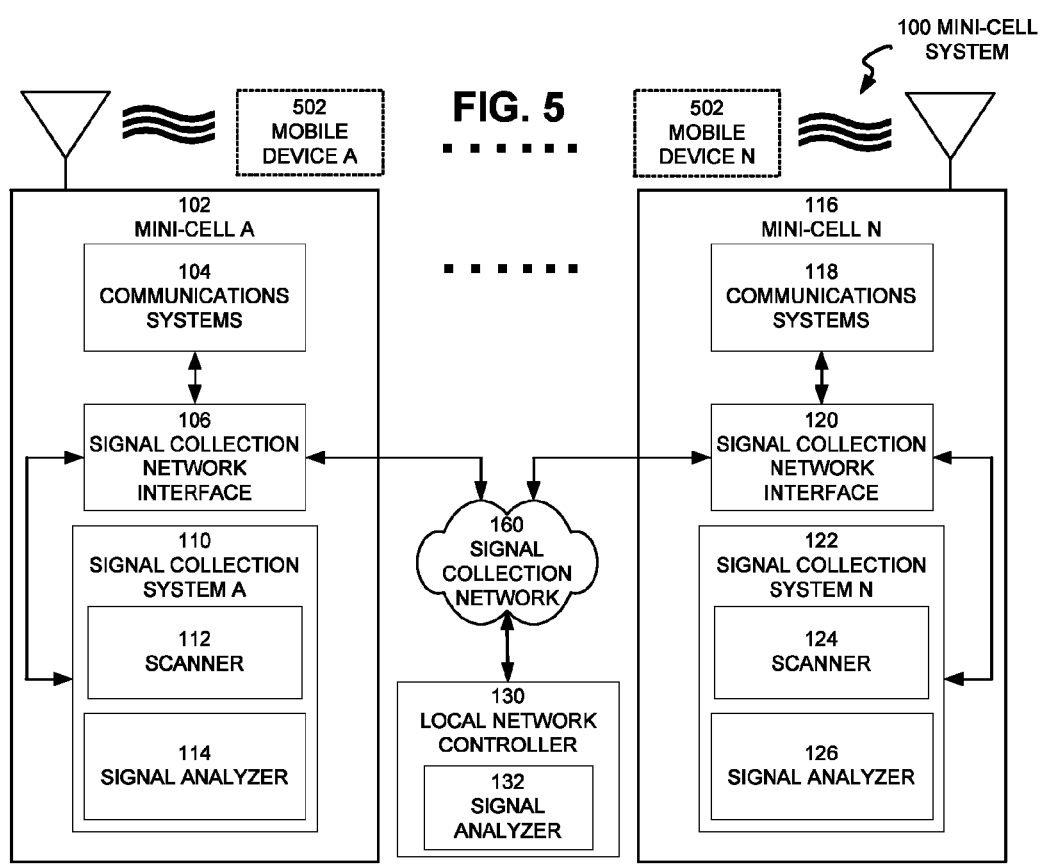
FIG. 5 is a block diagram illustrating a mini-cell system in which mobile devices report signal identification parameters to one or more mini-cells according to an embodiment.

FIG. 5 is a block diagram illustrating a mini-cell system 100 in which two mobile devices (blocks 502 and 504) are in communication with mini-cells A and N (blocks 102 and 116). In this embodiment, the various embodiments described above may be augmented with signal identification parameters acquired from the mobile devices 502 and 504.

Figure 6:
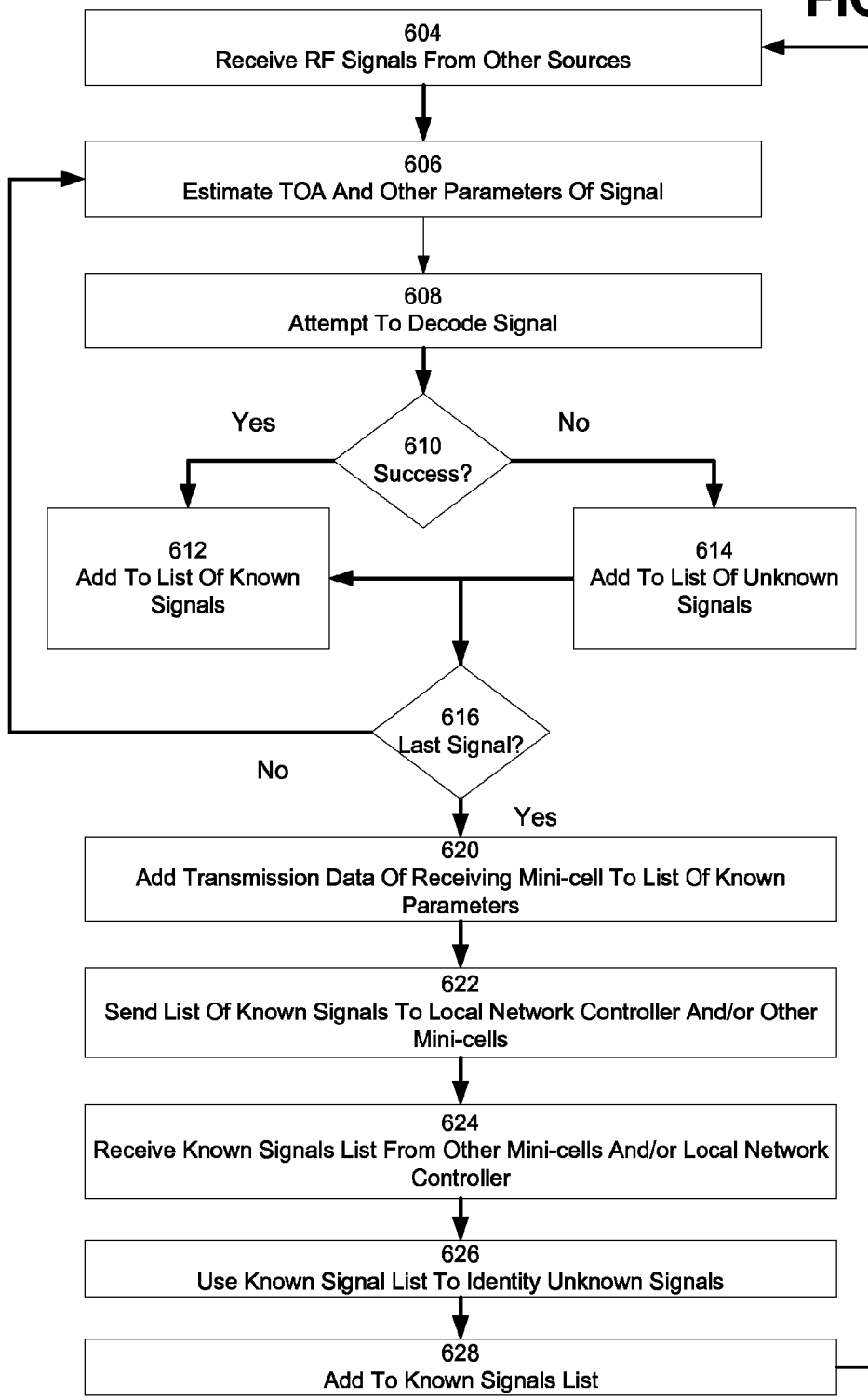
FIG. 6 is a flow diagram illustrating the communications of signal information between a mini-cell and a local network controller and/or other mini-cell in a mini-cell system according to an embodiment.

FIG. 6 is a flow diagram illustrating the communications of signal information between a mini-cell and a local network controller and/or other mini-cells in a mini-cell system according to an embodiment.

The flow illustrated in FIG. 6 is illustrative of the processing of signal information that may be shared by a signal analyzer located at a local network controller (see, FIGS. 3, 130 and 132) and a signal analyzer located in a mini-cell (see, FIGS. 3, 102 and 114).

A signal is received by a signal collection system (block 604). The signal analyzer element of the signal collection system estimates the time of arrival of the signal and other signal identification parameters (block 606). The signal analyzer attempts to decode the signal (block 608). A determination is made whether the signal was decoded. When the signal is decoded (that, when the decision in block 610 is "Yes"), the signal is added to a list of known signals (block 612). When the signal is not decoded (that, when the decision in block 610 is "No"), the signal is added to a list of unknown signals (block 614).

A determination is made whether the signal is the last signal to be evaluated. When the signal is not the last signal (that, when the decision in block 616 is "No"), the process continues with the next signal (block 606). When the signal is the last signal (that, when the decision in block 610 is "Yes"), the transmission data of the receiving mini-cells are added to the list of known signals (block 620). The list of known signals is then sent to the local network controller and/or other mini-cells (block 622) where it is received (block 624). The list of known signal parameters may be used to identify signals previously unidentified (block 626). The newly identified signals are added to the list of known signals (block 628). A new scan is initiated and the process repeats (block 606).

Figure 7:
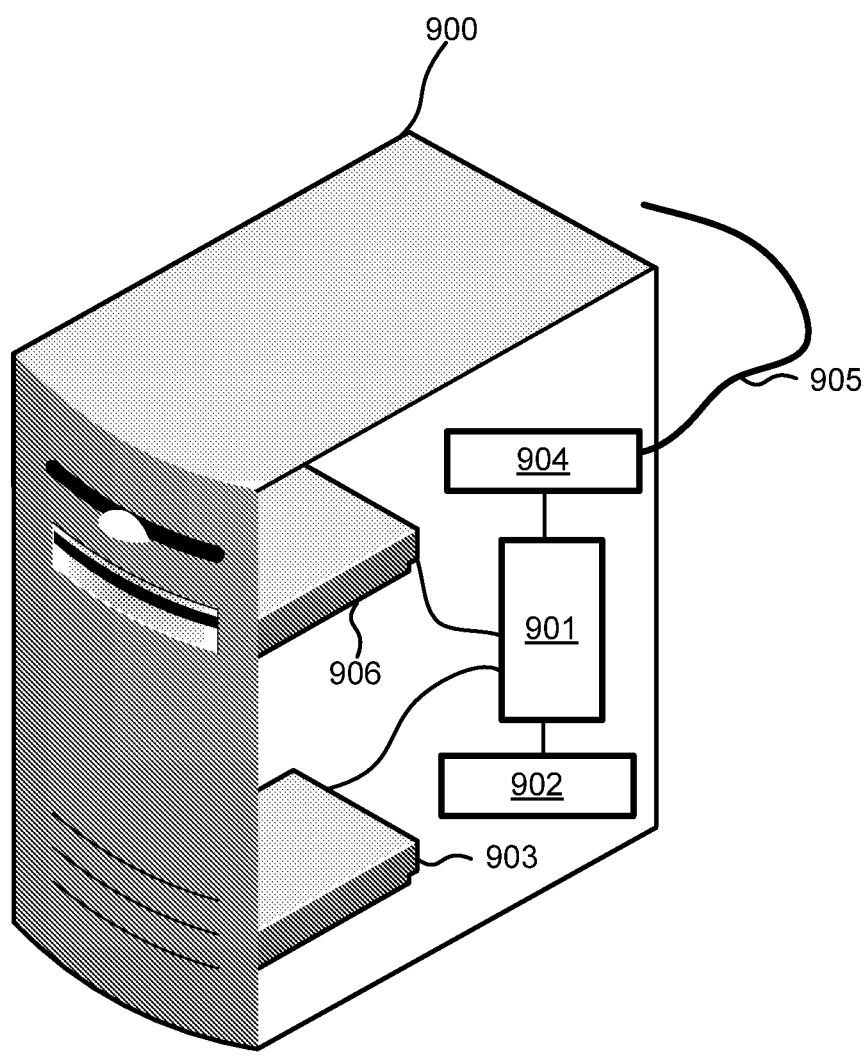
FIG. 7 is a component block diagram of a server device suitable for use in the various embodiments.

As used herein, a signal analyzer may be implemented on a computing device such as a server 900 illustrated in FIG. 7. The server 900 may be configured to interact in an automated fashion with other devices over a network to serve content and web pages, to issue responses to communications from other network devices, to respond to queries from other network devices and to execute software instructions to perform various functions. Such a server 900 typically includes a processor 901 coupled to volatile memory 902 and a large capacity nonvolatile memory, such as a disk drive 903. The server 900 may also include a floppy disk drive and/or a compact disc (CD) drive 906 coupled to the processor 901. The server 900 may also include a number of connector ports 904 coupled to the processor 901 for establishing data connections with network circuits 905. The processor 901 may be configured to execute software instructions to perform the functions of a signal analyzer.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a processor. A general-purpose processor may be a microprocessor, but, in the alternative, the processor may be any conventional processor, controller, microcontroller, or state machine. Alternatively, some steps or methods may be performed by circuitry that is specific to a given function. The processor may also include a digital signal processor (DSP) that may perform various functions associated with signal analysis. Thus, a DSP may, for example, perform FFT, analog to digital conversion and digital to analog conversion as required to perform the various operations described herein.

In one or more exemplary embodiments, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as cellular, infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blu-ray disc where disks usually reproduce data magnetically and discs reproduce data optically with lasers. Combinations of the above should also be included within the scope of computer-readable media. Additionally, the operations of a method or algorithm may reside as one or any combination or set of codes and/or instructions on a machine-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. Thus, the present invention is not intended to be limited to the embodiments shown herein but is to be accorded the widest scope consistent with the principles and novel features disclosed herein. Further, any reference to claim elements in the singular, for example, using the articles "a," "an," or "the," is not to be construed as limiting the element to the singular.

The invention claimed is:

1. A method for identifying an interfering signal in a cellular mini-cell system, wherein the cellular mini-cell system comprises a plurality of mini-cells each comprising a signal collection system and a local network controller comprising a signal analyzer, the method comprising:
   receiving at the local network controller configuration parameters and timing parameters from a reporting mini-cell;
   storing the configuration parameters and the timing parameters in a known-signal datastore, wherein the known-signal datastore comprises configuration parameters and timing parameters of other mini-cells and signals associated with a source;
   receiving at the local network controller a signal sample of the interfering signal obtained by the collection system of the reporting mini-cells, wherein the signal sample of the interfering signal comprises at least one identifiable signal component;
   using the signal analyzer to apply a decoding process to the at least one identifiable signal component;
   decoding the at least one identifiable signal component to obtain identifying information of the source of the at least one identifiable signal component and storing the source identifying information in the known-signal datastore when the at least one identifiable signal component can be decoded;
   using the signal analyzer to apply a correlation process to the at least one identifiable signal component when the signal sample of the interfering signal cannot be decoded, wherein the correlation process utilizes at least one of the configuration parameters and the timing parameters with a known signal pattern and the source identifying information from the known signal record; and
   identifying the source of the at least one identifiable signal component and storing the source identifying information in the known signal record when the correlation process is successful.

2. The method of claim 1, wherein the configuration parameters are selected from the group consisting of a time of transmission of the signal, a scrambling code number of the signal, a modulation parameter, a subchannel used in a transmission frame, a subcarrier used in a transmission frame, an antenna beam parameter, a transmitter power setting, and location data.

3. The method of claim 1, wherein the source identifying information comprises a mini-cell identification code.

4. The method of claim 1, wherein the cellular mini-cell system uses an air protocol and the signal pattern is associated with the air protocol.

5. The method of claim 4, wherein the air protocol is selected from the group consisting of a GSM protocol, TDMA protocol, a CDMA protocol, an OFDM protocol, and a 4G protocol.

6. The method of claim 1, wherein the known signal pattern is selected from the group consisting of a training sequence, a synchronization burst, and a frequency correction burst.

7. The method of claim 1, wherein the identification parameters and the mini-cell identifying information are stored in a database accessible to the mini-cells of the network.

8. A method for measuring an interfering signal in a cellular mini-cell system, wherein the cellular mini-cell system comprises a plurality of mini-cells each comprising a signal collection system and a signal analyzer and a local network controller comprising a signal analyzer, the method comprising:
   receiving at a collecting mini-cell a signal sample from a reporting mini-cell near the collecting mini-cell, wherein signal sample comprises at least one identifiable signal component;
   using the signal analyzer at the collecting mini-cell to apply a decoding process to the at least one identifiable signal component of the signal sample;
   decoding the at least one identifiable signal component of the signal sample to obtain mini-cell identifying data and signal identification parameters of the reporting mini-cell;
   communicating from the collecting mini-cell the signal sample, the mini-cell identifying data and the signal identification parameters of the reporting mini-cell to other mini-cells within the network, including an interference measuring mini-cell; and
   using the signal analyzer of the interference measuring mini-cell to apply a correlation process to at least one identifiable signal component of an interfering signal wherein the correlation process utilizes the signal sample, the mini-cell identifying data and the signal identification parameters of the reporting mini-cell to determine whether the reporting mini-cell is the source of the interfering signal.

9. The method of claim 8, wherein the signal identification parameters of the reporting mini-cell parameters are selected from the group consisting of a time of transmission of the signal, a scrambling code number of the signal, a modulation parameter, a subchannel used in a transmission frame, a subcarrier used in a transmission frame, an antenna beam parameter, a transmitter power setting, and location data.

10. The method of claim 8, wherein the signal identification parameters and the mini-cell identifying data are stored in a database accessible to the mini-cells of the network.

* * * * *